(12) United States Patent
Dong et al.

(10) Patent No.: US 12,361,004 B1
(45) Date of Patent: Jul. 15, 2025

(54) MULTI-AGENT SEARCH CLIENT

(71) Applicant: Zoom Video Communications, Inc., San Jose, CA (US)

(72) Inventors: Qiumin Dong, Suzhou (CN); Lin Han, Los Altos, CA (US); Chen Li, Suzhou (CN); Ying Lu, Cerritos, CA (US); Kai Ni, Sammamish, WA (US); Wang Tian, Hefei (CN); Da-Yi Wu, Singapore (SG); Linxiao Zeng, Singapore (SG)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/413,732

(22) Filed: Jan. 16, 2024

(51) Int. Cl.
*G06F 16/2455* (2019.01)
*G06F 16/248* (2019.01)

(52) U.S. Cl.
CPC ........ *G06F 16/2455* (2019.01); *G06F 16/248* (2019.01)

(58) Field of Classification Search
CPC ............................ G06F 16/2455; G06F 16/248
See application file for complete search history.

(56) References Cited

U.S. PATENT DOCUMENTS

2003/0035387 A1 * 2/2003 Kim .................... H04L 61/4511 370/328
2003/0187832 A1 * 10/2003 Reader ................ G06F 16/9535
2005/0004898 A1 * 1/2005 Bluhm ................. G06F 16/953

OTHER PUBLICATIONS

Wu et al., "AutoGen: Enabling Next-Gen LLM Applications via Multi-Agent Conversation"; Oct. 3, 2023, 43 pages.
AutoGen: Enabling Next-Generation Large Language Model Applications; Microsoft Research Podcast, Sep. 25, 2023, 9 pages.
MetaGPT: The Multi-Agent Framework"; The Multi-Agent Framework: Given One Line Requirement, Return PRD, Design, Tasks, Repo"; 6 pages.
Yoheinakajima/Babyagi—GitHub, 7 pages.

* cited by examiner

*Primary Examiner* — Baoquoc N To
(74) *Attorney, Agent, or Firm* — Kilpatrick Townsend & Stockton LLP

(57) ABSTRACT

Techniques are disclosed relating to a multi-agent search client. In an example method, a search agent application receives a query. The search agent application determines, using a search agent, one or more agents to each execute a portion of the query. The search agent application outputs, to a domain agent, a portion of the query. The search agent application determines, using the domain agent, an execution step based on the portion of the query and information about an executor. The executor generates instructions based on the execution step that are configured to generate a response to the execution step and outputs a command to execute the instructions. The executor then outputs, to the first domain agent, the response to the execution step. The search agent application outputs, using the search agent, a response to the query based on the response to the execution step.

20 Claims, 10 Drawing Sheets

MULTI-AGENT SEARCH CLIENT

FIELD

The present application generally relates to searching, and more particularly relates to techniques for implementing a multi-agent search client.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
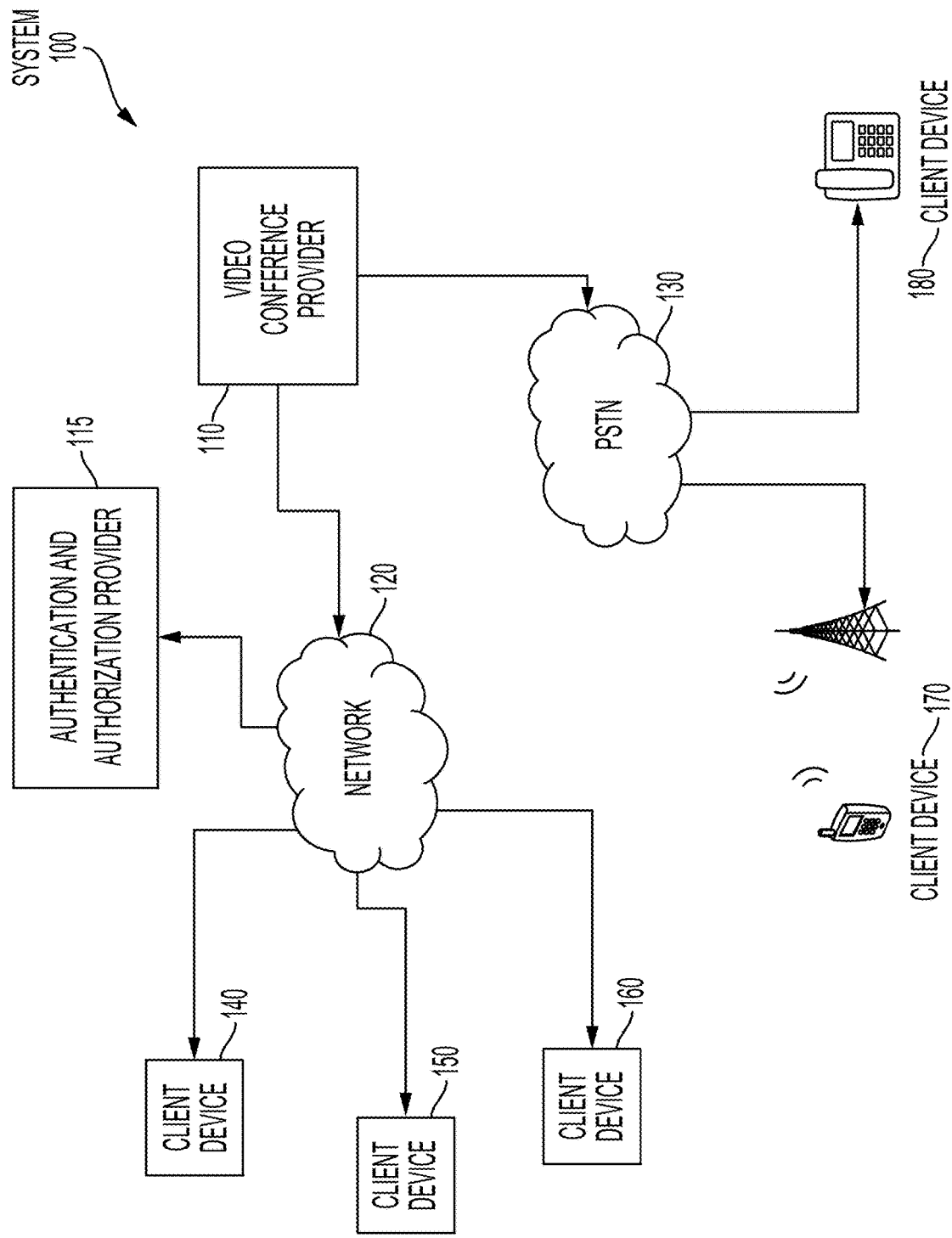
FIG. 1 shows an example system that provides videoconferencing functionality to various client devices, according to some aspects of the present disclosure.

Examples are described herein in the context of techniques for providing multi-agent search clients. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Widespread video conferencing is an integral part of enterprise and personal communications. In addition to straightforward verbal communication, modern video conferencing tools may include suites of applications that add a variety of functionality to video conferencing experiences. For example, applications can enable functionality that includes content generation, storage, sharing, duplication, editing, and so on. As a result, content associated with video conferencing, particularly for multi-member organizations can rapidly proliferate and become difficult to manage. Additionally, video conferencing participants may require more than basic content-sharing operations such as copying or attaching. For example, content may need to be converted, resized, translated, summarized, encrypted, and so on.

A typical solution to managing large amounts of content may involve search. Existing techniques may use traditional approaches to search, such as sequential keyword searching, navigating search indexes or trees, using hash tables, and so forth. These approaches may be effective in some cases, but are inflexible and inefficient, particularly when search terms are only vaguely specified. Moreover, traditional approaches may not allow natural language queries and may lack the ability to perform additional, arbitrary operations beyond search. "Natural language," as used herein, refers generally to human-readable text as would be found in a conversation between two humans about the subject of the search. In particular, natural language queries may not require specific, machine-readable details or instructions.

To address these challenges, techniques for implementing a multi-agent information retrieval and generation client are provided. A search agent application can receive a natural language query from a client device and use a language model to divide the query up into portions that can be addressed by a number of domain agents. The domain agents may be specialized components configured to process query portions relating to particular specializations such as video conferences, user information, Internet search, and so on. The domain agents may themselves be or include language models. The domain agents can determine a number of steps to complete each respective portion, which are then passed to executors for execution. The search agent application can receive the responses to the steps from the domain agents and assemble a natural language response to the query from the various responses.

The following non-limiting example is introduced to illustrate certain concepts. In an example method, a computing device is executing program code that implements a search agent application. The search agent application receives, from a client device, a query. For example, the query may be a natural language query requesting a particular piece of content or an operation thereon. For instance, one query may request a link to a recording of a video conference in which Project A was discussed. Another query may request a two paragraph summary of an encrypted video conference in which Project A was discussed.

The search agent application determines, using a language model and based on the query, a number of domain agents to each execute at least a portion of the query. For example, given a query requesting a two paragraph summary of the encrypted video conference in which Project A was discussed, the language model may determine that a domain agent for locating a recording of the meeting is needed and agents for decrypting and summarizing the recording, if it can be found, are needed.

The search agent application then outputs, to each determined domain agent, the relevant portion of the query. Each domain agent determines a number of execution steps needed to complete the portion of the query it has been delegated. The determined execution steps are determined based on what is known about the available executors. Example executors may include a component for querying an API, a transcription component, an encryption/decryption component, or an LLM configured for summarization, among many other possibilities. The determined execution steps are relayed to the executors.

The executors generate instructions to perform based on the received execution steps that will generate a response that is responsive to the received execution steps. For each of the instructions, the executors execute commands to cause execution of the instruction. Once execution of the instructions is complete, each executor then outputs, back to the delegating domain agent, the response or responses.

The various delegating domain agents receive the responses from the executors and relay them back to the search agent that received the original query. The search agent, which may be a language model, then generates a natural language response along with relevant content attachments, if applicable, to the query based on the responses to the execution steps and outputs it to the client device.

The innovations of the present disclosure provide significant improvements in the technical field of search, particularly in the context of video conferencing platforms. Such platforms may have domains or specializations that are well-adapted to the capabilities of the configurations of domain agents and executors as disclosed herein. Using the techniques of the present disclosure, arbitrary search of the various domain objects in the context of a video conferencing platform may now be possible. Existing systems required customized components for each possible type of search, including custom program code and execution contexts. Using the techniques of the present disclosure, arbitrary searches against any domain objects in the context of a video conferencing platform are possible. Moreover, such searches may be performed using natural language in concert with LLMs, such that users require no particular technical expertise to execute arbitrarily complex search queries against the domain objects in the context of a video conferencing platform.

The innovations of the present disclosure can also improve the functioning of a computing system implementing a multi-agent search client. In a multi-agent search client using one or more LLMs, only a single, trained model may be needed for determination of and execution of execution steps. Existing systems may have required geometrically more components adapted or otherwise customized to the particular types of anticipated queries. All such custom components can be replaced with a single set of LLM-based (or equivalent) trained models or systems. Moreover, such trained models can be externally hosted and accessed using a suitable API, further unburdening processing resources. Thus, some implementations of the present disclosure may consume considerably less processing and memory resources. Additionally, the functioning of implementing computing devices can be further improved through more efficient use of the searching facilities. Where before multiple searches may have been required to obtain the desired results, such complex operations can now be replaced with a single, well-stated prompt to the search agent.

These illustrative examples are given to introduce the reader to the general subject matter discussed herein and the disclosure is not limited to these examples. The following sections describe various additional non-limiting examples of techniques for implementing multi-agent search clients.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the chat and video conference provider 110 over a public network.

The system optionally also includes one or more user identity providers, e.g., user identity provider 115, which can provide user identity services to users of the client devices 140-160 and may authenticate user identities of one or more users to the chat and video conference provider 110. In this example, the user identity provider 115 is operated by a different entity than the chat and video conference provider 110, though in some examples, they may be the same entity.

Figure 2:
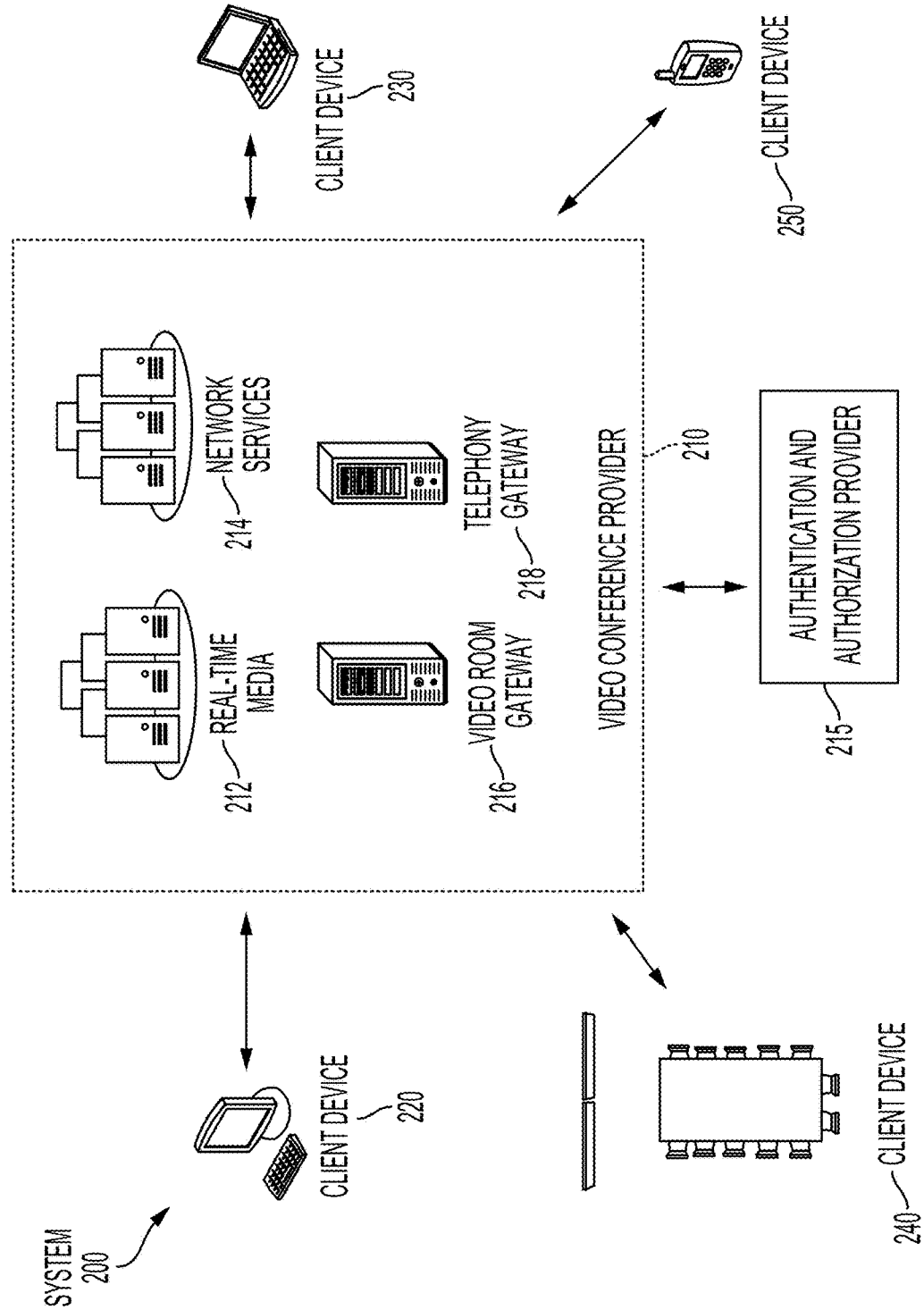
FIG. 2 shows an example system in which a video conference provider provides videoconferencing functionality to various client devices, according to some aspects of the present disclosure.

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and video conference provider 110.

A user identity provider 115 may be any entity trusted by the chat and video conference provider 110 that can help identify a user to the chat and video conference provider 110. For example, a trusted entity may be a server operated by a business or other organization with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as two-factor authentication. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and video conference provider 110.

When the user accesses the chat and video conference provider 110 using a client device, the chat and video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide user identification information to identify the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the chat and video conference provider 110, even in cases where the user has an authenticated identity and employs a client device capable of identifying the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more user identity providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and video conference provider 210, or scheduling a new meeting, by interacting with the network services servers 214.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some embodiments, in addition to the video conferencing functionality described above, the chat and video conference provider 210 (or the chat and video conference provider 110) may provide a chat functionality. Chat functionality may be implemented using a message and presence protocol and coordinated by way of a message and presence gateway 217. In such examples, the chat and video conference provider 210 may allow a user to create one or more chat channels where the user may exchange messages with other users (e.g., members) that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 210 may provide permission to a user and/or an owner of the chat channel may provide permission to the user. Furthermore, there may be any number of members permitted in the chat channel.

Similar to the formation of a meeting, a chat channel may be provided by a server where messages exchanged between members of the chat channel are received and then directed to respective client devices. For example, if the client devices 220-250 are part of the same chat channel, messages may be exchanged between the client devices 220-240 via the chat and video conference provider 210 in a manner similar to how a meeting is hosted by the chat and video conference provider 210.

Figure 3:
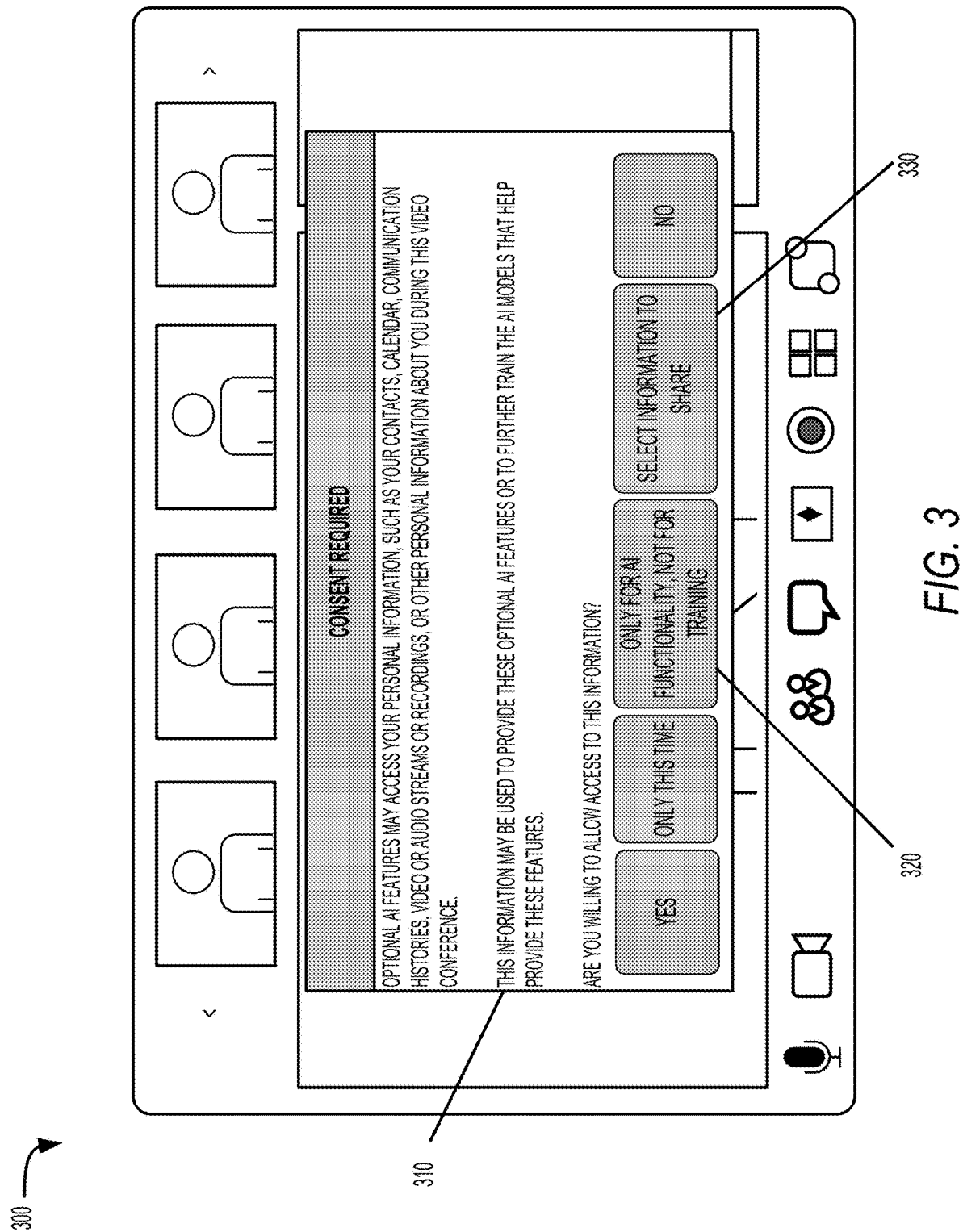
FIG. 3 shows an example user interface that may be used in some example systems configured for providing multi-agent search clients, according to some aspects of the present disclosure.

Turning next to FIG. 3, FIG. 3 shows an example user interface 300 that may be used in some example systems configured for providing multi-agent search clients. In some examples according to the present disclosure, a user may select an option to use one or more optional AI features available from the virtual conference provider 302. The use of these optional AI features may involve providing the user's personal information to the AI models underlying the AI features. The personal information may include the user's contacts, calendar, communication histories, video or audio streams, recordings of the video or audio streams, transcripts of audio or video conferences, or any other personal information available the virtual conference provider. Further, the audio or video feeds may include the user's speech, which includes the user's speaking patterns, cadence, diction, timbre, and pitch; the user's appearance and likeness, which may include facial movements, eye movements, arm or hand movements, and body movements, all of which may be employed to provide the optional AI features or to train the underlying AI models.

Before capturing and using any such information, whether to provide optional AI features or to providing training data for the underlying AI models, the user may be provided with an option to consent, or deny consent, to access and use some or all of the user's personal information. In general, Zoom's goal is to invest in AI-driven innovation that enhances user experience and productivity while prioritizing trust, safety, and privacy. Without the user's explicit, informed consent, the user's personal information will not be used with any AI functionality or as training data for any AI model. Additionally, these optional AI features are turned off by default-account owners and administrators control whether to enable these AI features for their accounts, and if enabled, individual users may determine whether to provide consent to use their personal information.

As can be seen in FIG. 3, a user has engaged in a video conference and has selected an option to use an available optional AI feature. In response, the GUI has displayed a consent authorization window 310 for the user to interact with. The consent authorization window 310 informs the user that their request may involve the optional AI feature accessing multiple different types of information, which may be personal to the user. The user can then decide whether to grant permission or not to the optional AI feature generally, or only in a limited capacity. For example, the user may select an option 320 to only allow the AI functionality to use the personal information to provide the AI functionality, but not for training of the underlying AI models. In addition, the user is presented with the option 330 to select which types of information may be shared and for what purpose, such as to provide the AI functionality or to allow use for training underlying AI models.

Figure 4:
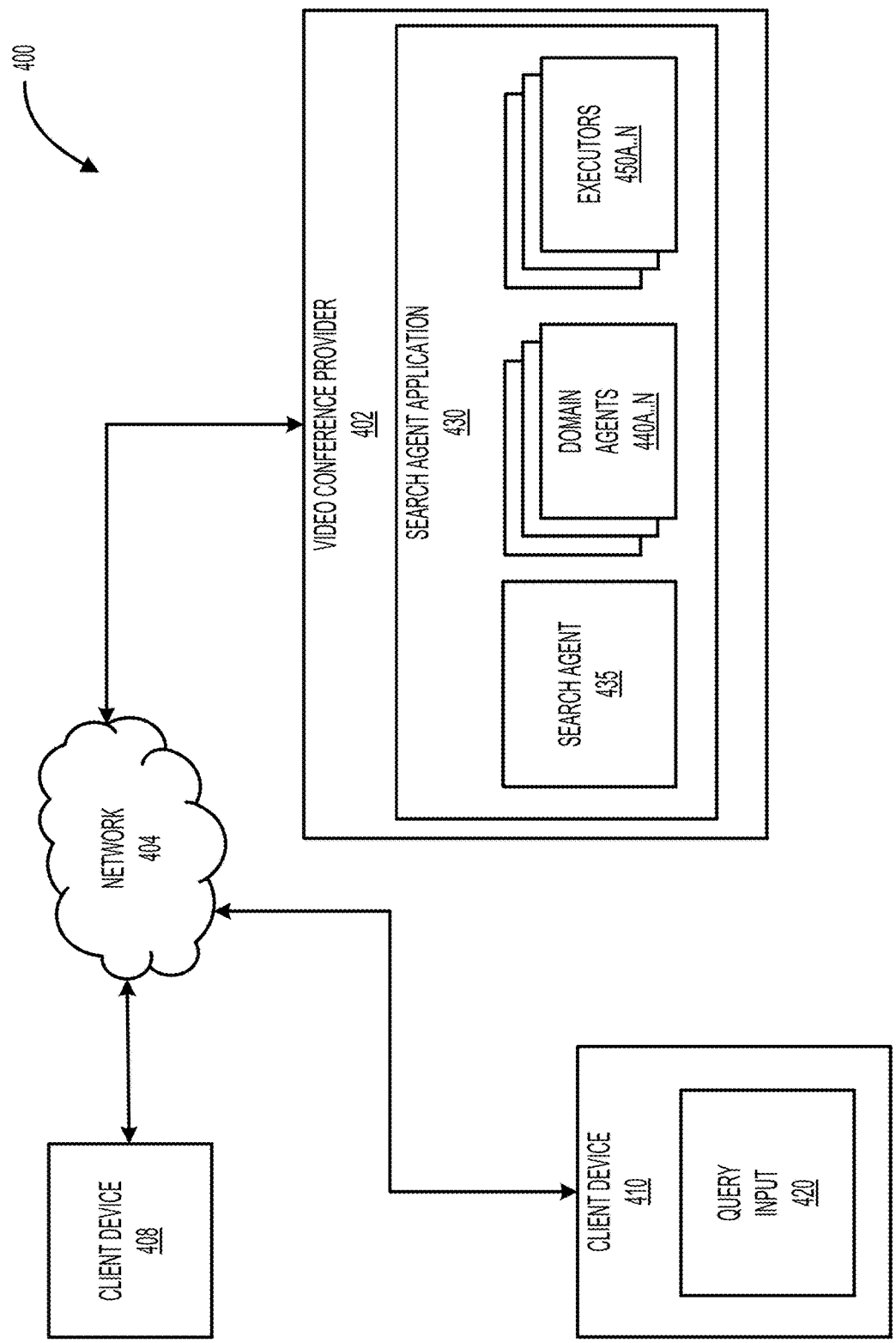
FIG. 4 shows an example of a system implementing a multi-agent search client, according to some aspects of the present disclosure.

Referring now to FIG. 4, FIG. 4 shows an example of a system 400 implementing a multi-agent search client, according to some aspects of the present disclosure. System 400 includes two client devices 408, 410 communicatively coupled with video conference provider 402 over a network 404. Network 404 may include the Internet, public networks, private networks, or combinations thereof. Video conference provider 402 is typically a server or collection of servers, including a combination of privately or cloud-hosted devices. Video conference provider 402 may be similar, in some respects, to the video conference providers 110, 210 described above with respect to FIGS. 1 and 2.

Figure 6:
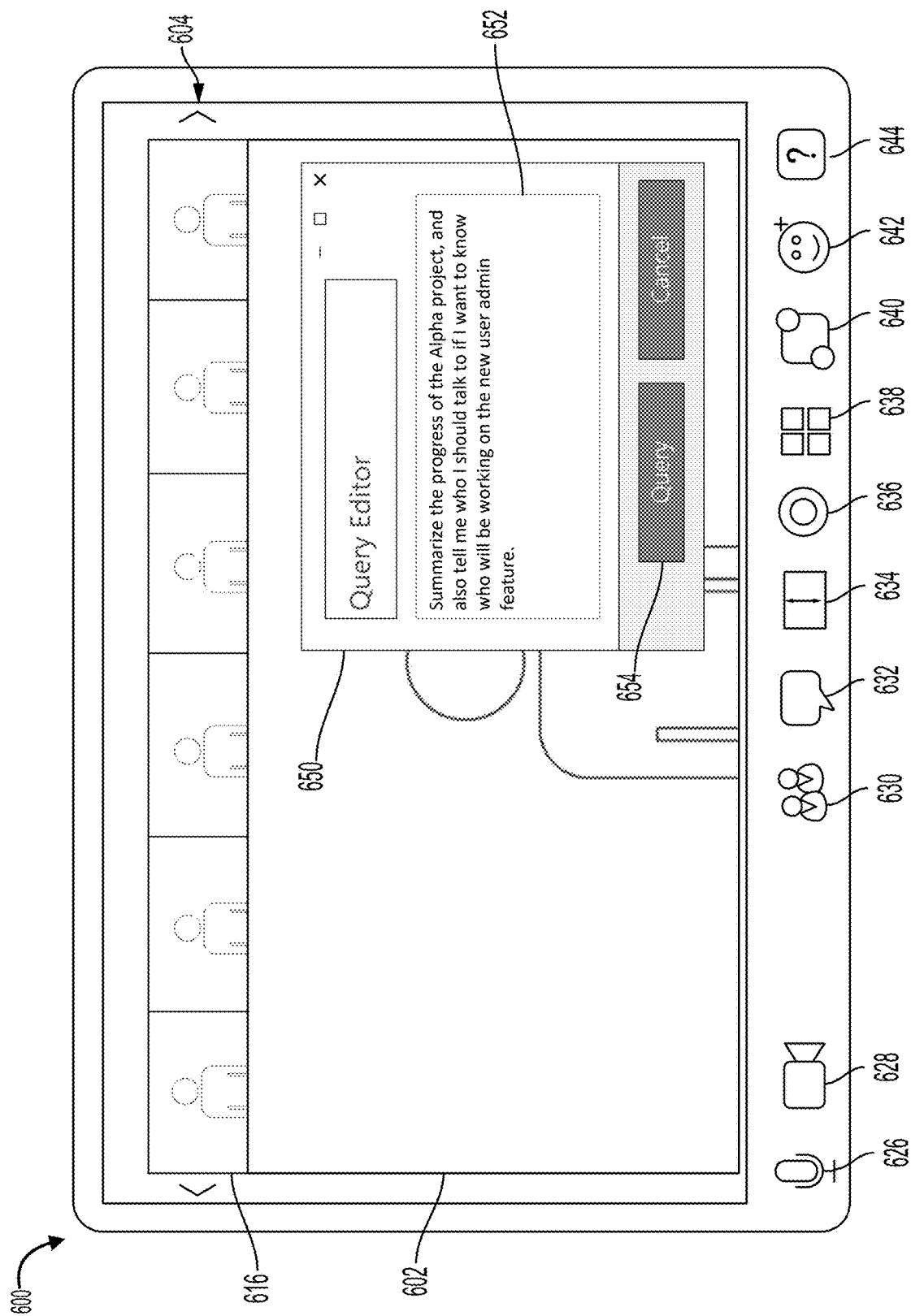
FIG. 6 depicts an example of a graphical user interface that may be used in system implementing a multi-agent search client, according to some aspects of the present disclosure.

Client devices 408, 410 may be any type of device capable of executing the appropriate client software for executing queries using a multi-agent search client. For example, the client devices 408, 410 may be laptops, desktops, smartphones, tablets, internet protocol (IP) phones, and so on. Client device 410 is depicted with query input 420. Query input 420 may include suitable input devices and user interfaces for providing an indication of a query to the search agent application 430. For instance, query input 420 may include a graphical user interface (GUI) including a query editor or input control. An example of such a control is illustrated in FIG. 6. Using query input, a user of the client device 410 can input a query by typing, using a microphone, or any other suitable input means. For instance, a user may input a natural language query such as "Summarize yesterday's meeting for me, the one with Alice and Bob that was around 3."

In the example shown, video conference provider 402 includes search agent application 430 as a component. However, search agent application 430 can also be a stand-alone component. For instance, search agent application 430 can be hosted on a distinct server environment from video conference provider 402 or in a cloud-hosting environment. In that case, video conference provider 402 can use functions provided by the search agent application 430 through a web-based application programming interface (API) or similar interface (e.g., remote procedure call (RPC)).

The search agent application 430 includes components for providing functionality to a multi-agent search client as may be implemented on client device 410. Search agent application 430 includes a search agent 435. The search agent 435 receives natural language queries from the client device 410 and determines one or more domain agents to execute portions of the query. For example, the search agent 435 may be a large language model (LLM). LLMs, such as GPT-4, LLAMA 2, or Claude 2, etc., are machine learning models trained on large amounts of text data to interpret and generate natural language text. In some other examples, the search agent 435 may be a specialized search algorithm, a knowledge graph-based system, a rule-based AI, a trained neural network, or a hybrid system combining multiple approaches.

The search agent 435 receives the natural language query input using query input 420 and determines one or more corresponding portions. For example, a query such as "Please tell me who the project manager of Project A is" may be divided, in one example processing, into at least three portions: a search for Project A; a search for indications of the project manager within documents returned from the previous portion; and a determination of who the most likely project manager is based on the second search. Other divisions of labor and approaches to addressing the query may be determined according to stochastic factors, the model in use, whether a similar query has been given previously, and so on.

The search agent 435 can determine which domain agent, from among a set of domain agents 440A . . . N, is best suited for the performance the task or tasks associated with the query portions determined. Using the query portions from the previous example, the search for Project A may be designated for a database search domain agent; the search for indications of the project manager may be designated for a text search domain agent; and the determination of who the most likely project manager is based on the second search may be designated for a language model domain agent. Many other allocations of domain agents are possible depending on factors such as the particular query, the training of the language model, the available domain agents, and so on.

The domain agents 440A . . . N, upon receipt of a query portion, determine a number of execution steps associated with the query portion. The execution steps are determined based on information about one or more executors 450A . . . N. For instance, a database search domain agent may have information about executors such as an executor that can execute queries against a database directly, an executor that can perform API requests that can result in database searches, an executor that can perform command line operations, and an executor with cached results from previous queries. The domain agents 440A . . . N can determine, from each query portion, execution steps based on such information. Using a query portion from the previous example, the search for Project A that is designated for the database search domain agent can involve execution steps such as performing an API request to obtain relevant information (e.g., project IDs, document type identifiers, authentication information, etc.), execution of a SQL query using the information obtained in the API request, or performing text manipulation operations to place the results in a useful format.

The executors 450A . . . N can be any hardware or software component configured to carry out the execution steps determined by the domain agents 440A . . . N. A non-exclusive list of example executors 450A . . . N includes components such as database clients, HTTP clients, command line clients, command shells, software libraries, web servers, and so on. The executors 450A . . . N may also include one or more language models. In some examples, the domain agents 440A . . . N and the language model executors can be communicatively coupled among one another such that the components capable of conversing can converse to perform the execution tasks. In some examples, the executors 450A . . . N can operate in various modes. For example, an executor capable of execution of scripts or other program code can be instructed to operate as an executor capable of variable types of instructions. For instance, a domain agent can determine an execution step relating to data analysis and an execution step relating to graphical presentation of data analysis results. The first execution step can include instructions to operate an executor in a first mode, where the second execution step can include instructions to operate the same executor in a second mode.

The executors 450A . . . N, upon completion of instructions, send outputs to the domain agents 440A . . . N based on the executed instructions. The outputs can be sent, by the domain agents 440A . . . N, to search agent 435 for assembly into a query response. Continuing the example above involving the natural language query, "Please tell me who the project manager of Project A is," a language model domain agent may return its determination of who the most likely project manager is based on results returned to the other domain agents 440A . . . N or from executors 450A . . . N. As previously mentioned, the domain agents 440A . . . N and executors 450A . . . N may be communicatively coupled and may converse as needed to assemble the execution step results into a query response.

Figure 5A:
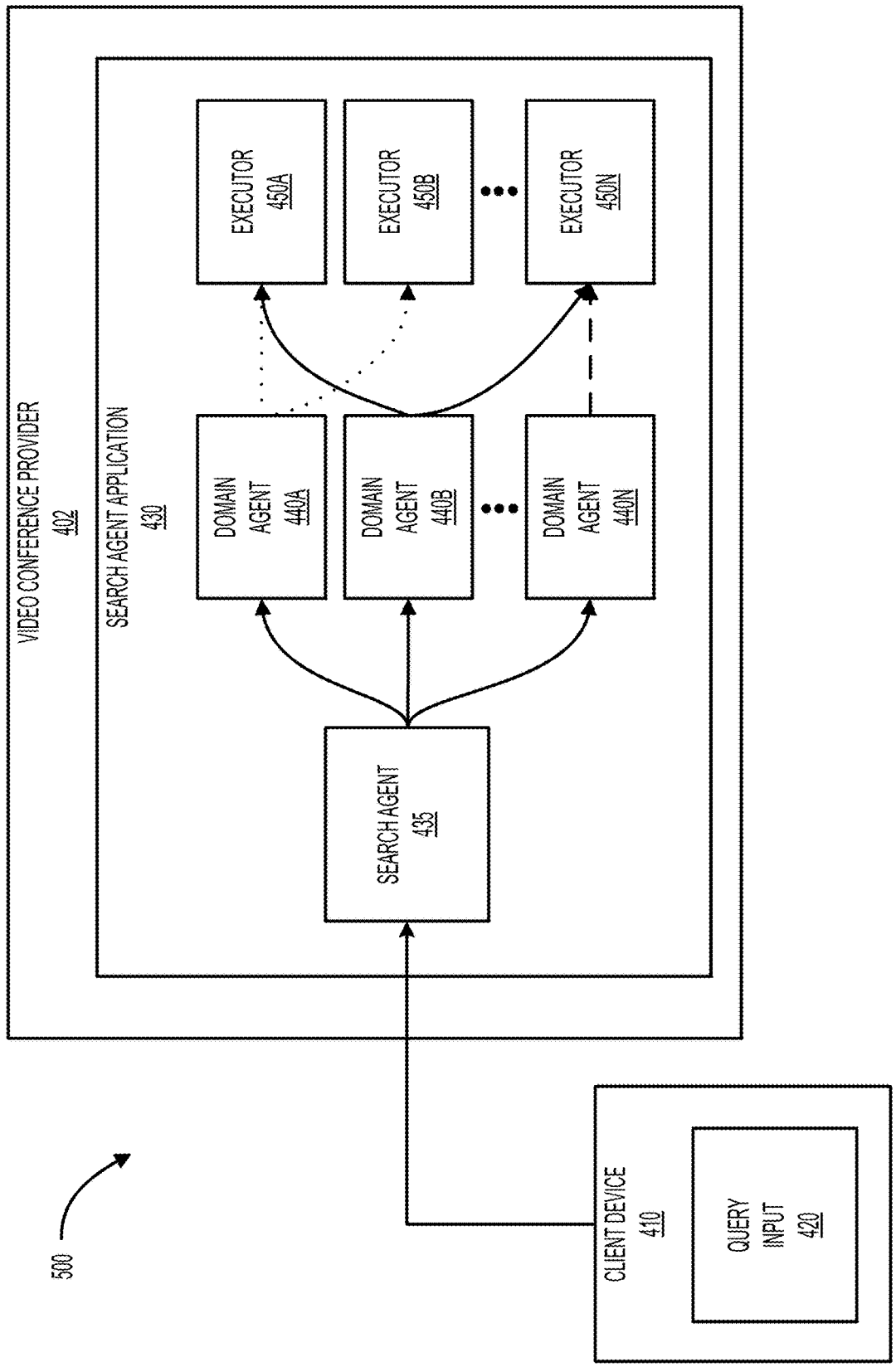
FIGS. 5A and 5B show examples of a system including additional details of an example implementation of a search agent application, according to some aspects of the present disclosure.
Figure 5B:
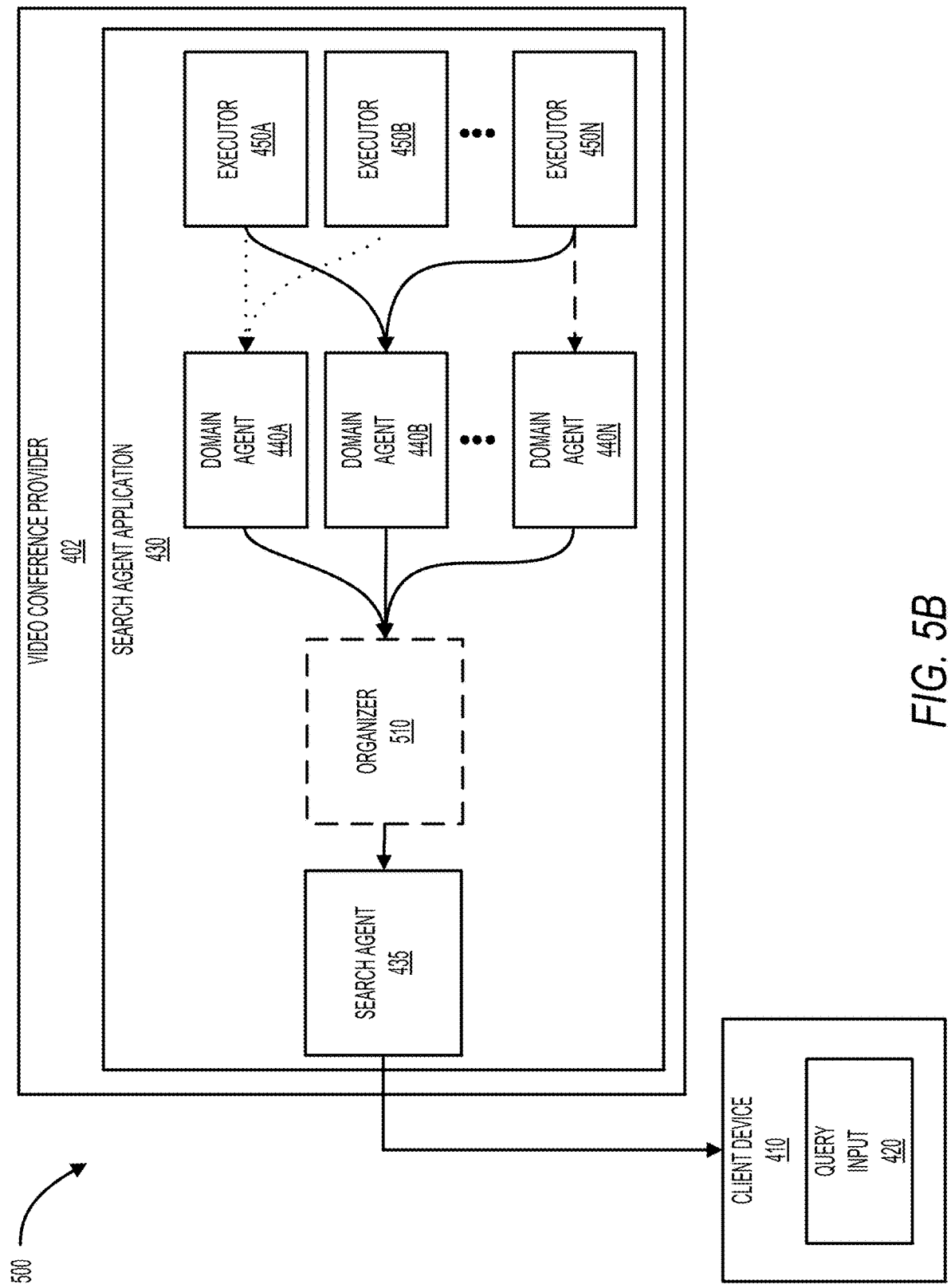

Referring now to FIGS. 5A and 5B, FIGS. 5A and 5B show an example of a system 500 including additional details of an example implementation of the search agent application. In FIG. 5A, search agent 435 of system 500 is shown in receipt of a query from client device 410. In the example configuration depicted in system 500, a plurality of domain agents 440A . . . N determine execution steps for execution by a plurality of executors 450A . . . N. However, implementations of systems for multi-agent search clients can include variable numbers of domain agents 440A . . . N and executors 450A . . . N. Some configurations may, for instance, include only a single domain agent and a single executor. Some configurations may, for instance, include a plurality of domain agents 440A . . . N and a single executor. Some configurations may include a single domain agent and a plurality of executors 450A . . . N. Some configurations may include a plurality of domain agents 440A . . . N and a plurality of executors 450A . . . N. It should be noted that while example system 500 is depicted with a plurality of domain agents 440A . . . N and a plurality of executors 450A . . . N, some or all of which can be LLMs, in some configurations, all of these functions can be performed by a single LLM. For instance, a single (or other number of LLMs) LLM can be configured to simultaneously perform the functions of the domain agents 440A . . . N and a the executors 450A . . . N.

Search agent 435 determines one or more domain agents 440A . . . N to each execute at least a portion of the query and outputs the determined query portion(s) to the corresponding domain agents 440A . . . N. The search agent 435 may be an LLM that breaks the query up into portions to be performed by one or more domain agents 440A . . . N. Domain agents 440A . . . N may be mapped to one or more domains. In this context, "domain" refers to an area of technical specialization for which the particular domain agent is suited for query resolution. For example, domains may include specializations such as video, chat, documents, meetings, or language, among many others. Some domains may be non-specific. For instance, a particular domain agent may be a non-specialized LLM that is configured to determine execution steps for query portions for which a domain cannot be neatly determined. Certain query portions may be sent to more than one domain agent for execution.

Domain agent specialization can be configured in accordance with the needs of a particular system. For example, in an example system 500 configured for general search tasks relating to video conferencing, the domains selected for the domain agents 440A . . . N may be chat, documents, meetings, and user information. The domain agents 440A . . . N may be LLMs that are specialized for the selected domains. LLMs can be specialized using techniques such domain-specific pre-training, model alignment, supervised fine-tuning, retrieval-augmented generation, or other techniques. Domain agents 440A . . . N that are not LLMs can be specialized in accordance with techniques specific to the particular domain agent.

Each domain agent of the domain agents 440A . . . N determines one or more execution steps based on the received query portion(s) based on what is known about the available executors 450A . . . N. Each query portion may cause execution steps in one or more executors 450A . . . N. For example, a query portion relating to "finding projects about subject X" have involve an API request to obtain relevant keys from a first executor and a database query to be performed by a second executor. The domain agent 440A . . . N may generate natural language execution steps or machine-readable execution steps that are interpretable by the respective executors 450A . . . N. For instance, natural language execution steps may be used to instruct an executor that is itself an LLM. In another examples, machine-readable execution steps may include SQL queries to be executed by an executor including a relational database client.

In the example shown in FIG. 5A, domain agent 440A determines execution steps that are sent to executors 450A and 450B, as shown using dotted lines. Domain agent 440B determines execution steps that are sent to executors 450A and 450N, as shown using solid lines. Domain agent 440N determines execution steps that are sent only to executor 450N, as shown using a dashed line.

In FIG. 5B, search agent application 430 returns the result of the query to the client device 410. For example, each of the executors 450A . . . N can receive the determined execution steps from the domain agents 440A . . . N. Based on the received execution steps, the executors 450A . . . N can generates instructions based on the received execution steps for generating a response to the execution steps. The executors 450A . . . N can then output, for each of the determined instructions, commands to execute the determined instructions. The output of those executions can then be output back to the requesting domain agent.

In some examples, the domain agents 440A . . . N output execution step results to the search agent 435. The execution step results may be transformed as appropriate for use by the search agent 435 in assembling the query response. For example, a particular domain agent may receive a query portion such as "get all projects involving user Z" which may result in tabular results being returned from an executor configured to execute SQL queries. The particular domain agent may convert the tabular data to natural language by extracting the project names or other identifiers and then send them to the search agent 435.

The search agent 435 receives responses from the domain agents 440A . . . N based on the query portion(s) and generates a response to the query based on the responses based on the query portion(s). For example, the search agent 435 may be an LLM that receives natural language responses from the domain agents 440A . . . N, which are themselves LLMs. The search agent 435 can assemble the various natural-language responses into a human-readable response to the overall query.

In some examples, the search agent application 430 includes an organizer 510. The organizer 510 can receive, from the domain agents 440A . . . N, responses to determined execution steps and generate information for generating the response to the query. For example, the organizer 510 may receive execution step responses from a number of domain agents 440A . . . N in a number of different formats. Or the organizer 510 may receive execution step responses from a number of domain agents 440A . . . N in order that differs from the ordering of the query portions. Other exceptional cases may also be mitigated through the operation of the organizer 510.

The organizer 510 can add the execution step responses to a suitable data structure or standard format prior to returning the execution step responses to the search agent 435. For example, an example query may be divided into a number of query portions each of which can be sent to one or more domain agents 440A . . . N. The query portions can be received by organizer 510 prior to relay to the domain agents 440A . . . N, which can then await the response. For instance, the organizer 510 may receive the query portions and generate associated asynchronous objects for receipt of expected data in the future such as promises, callbacks, futures, new threads, etc. The query portions can be then used to determine execution steps by the domain agents 440A . . . N, which are then performed by the executors 450A . . . N. The results can be returned to the organizer 510 which can then populate the appropriate asynchronous object and serialize it in preparation for returning to the search agent 435 in a natural language or other suitable format.

Referring now to FIG. 6, FIG. 6 depicts an example of a graphical user interface (GUI) 600 that may be used in system implementing a multi-agent search client, according to some aspects of the present disclosure, such as systems 400 or 500. For example, the GUI 600 depicts an example that may correspond to some elements of the query input component 420. Example GUI 600 may be provided for a software client, such as client device 410, that can interact with a virtual conference provider, such as video conference provider 402, to allow a user to connect to the video conference provider 402, chat with other users, or join virtual conferences. A client device, e.g., client device 410, executes a software client as discussed above, which in turn displays the GUI 600 on the client device's display. In this example, the GUI 600 is depicting a video conference in-progress with an example query input 420 control inside a view window 602.

GUI 600 includes the view window 602 that may show the user of the client device 410 or a representation of the user. In addition to the user, the GUI 600 shows a number of participants in a participants window 616. Participants window 616 may include a control 604 for seeing additional participants according to a particular view mode that is enabled.

Beneath the view window 602 are a number of interactive elements 626-644 to allow the participant to interact with the virtual conference software. Controls 626-628 may allow the participant to toggle on or off audio or video streams captured by a microphone or camera connected to the client device. Control 630 allows the participant to view any other participants in the virtual conference with the participant, while control 632 allows the participant to send text messages to other participants, whether to specific participants or to the entire meeting. Control 634 allows the participant to share content from their client device. Control 636 allows the participant toggle recording of the meeting, and control 638 allows the user to select an option to join a breakout room. Control 640 allows a user to launch an app within the virtual conferencing software, such as to access content to share with other participants in the virtual conference. Control 642 allows a user to select a reaction. A reaction may be selected based on a chat message, spoken work, or for any other reason. Available reactions may include, among others, emojis, GIFs, reactions from third-party applications, and so on. Control 644 allows a user to enter a query into a control 650 for query input 420.

Control 650 for query input 420 includes a query input window 652. The query input window 652 can be populated with a natural language query using a suitable input device such as keyboard or microphone configured for voice-to-text operation. Control 650 also includes a query control 654 for submitting the completed query to the search agent application 430 for processing. In addition to the examples shown, in some implementations, the control 650 may include additional components for query editing such as word processing controls, controls for persisting and loading persisting queries, social media sharing features, and so on.

A user may interact with such a GUI 600 when their client software is operating in a normal configuration, such as while at home or in an office. Thus, the user has full control over their audio and video settings, can freely chat with other participants, and can use any suitable audio or video encoders to provide high quality audio and video streams to other participants in a virtual conference. However, in other scenarios, the GUI 600 may be restricted to only allow certain functionality or to disable certain functionality.

Figure 7A:
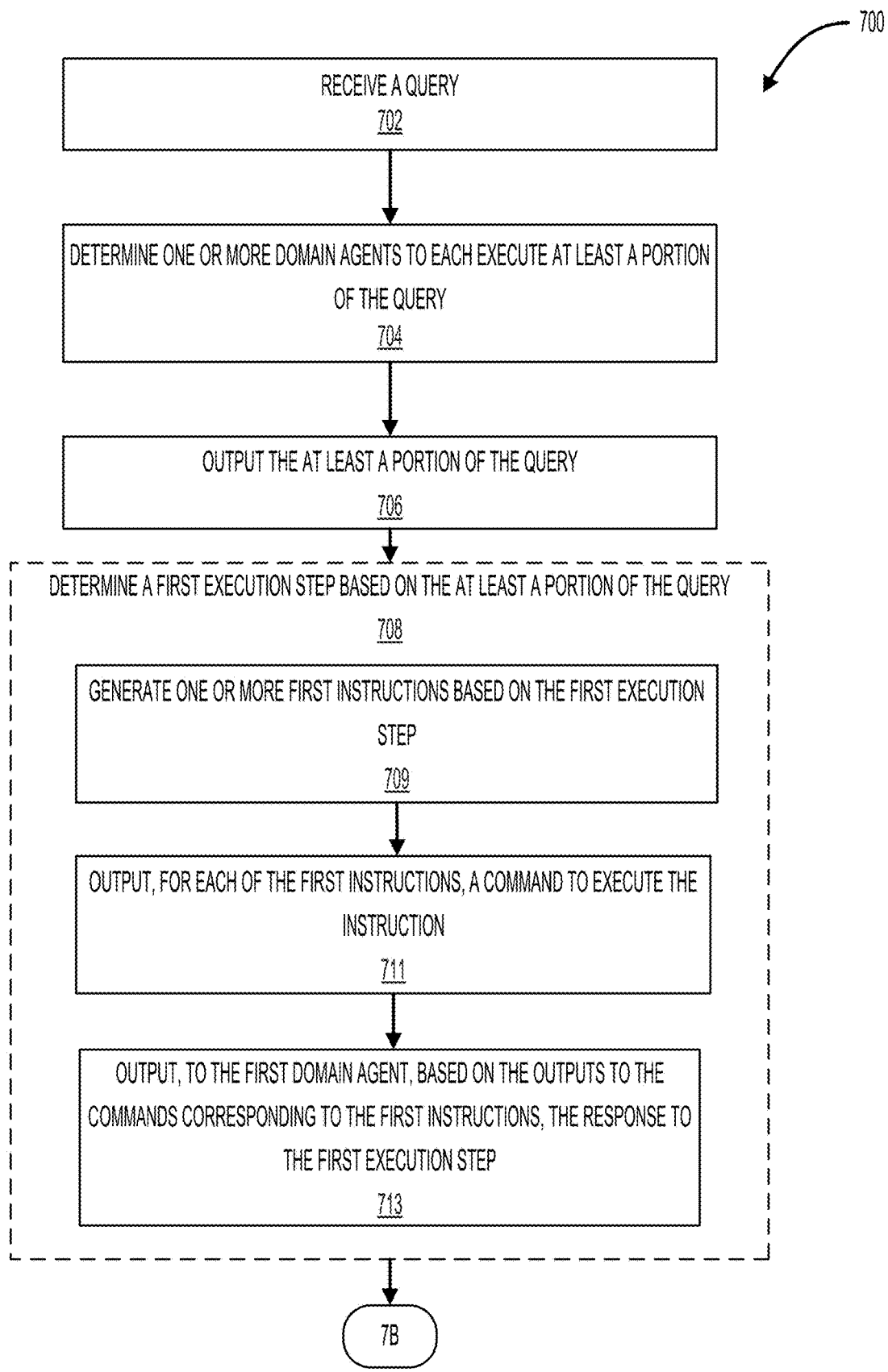
FIGS. 7A and 7B show a flowchart of an example method for providing a multi-agent search client, according to some aspects of the present disclosure.
Figure 7B:
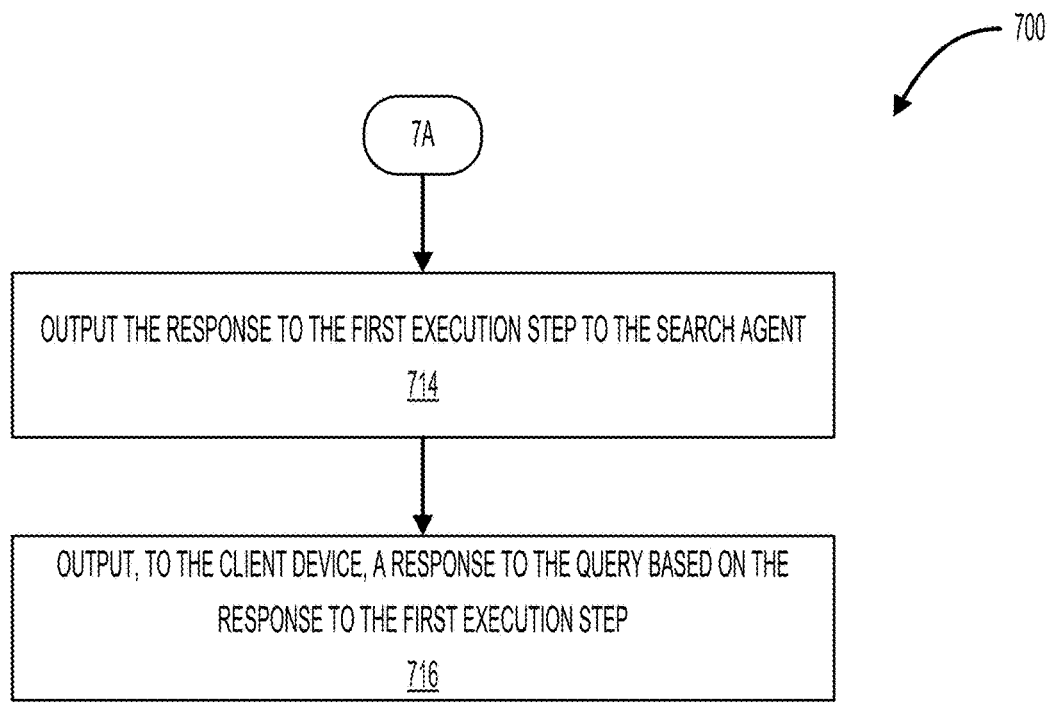

Referring now to FIGS. 7A and 7B, FIGS. 7A and 7B show a flowchart of an example method 700 for providing a multi-agent search client. The description of the method 700 in FIGS. 7A and 7B will be made with reference to FIGS. 4-6, however any suitable system according to this disclosure may be used, such as the example systems 100 and 200, shown in FIGS. 1 and 2. It should be appreciated that method 700 provides a particular method for providing a multi-agent search client. Other sequences of operations may also be performed according to alternative examples. For example, alternative examples of the present disclosure may perform the steps outlined above in a different order. Moreover, the individual operations illustrated by method 700 may include multiple sub-operations that may be performed in various sequences as appropriate to the individual operation. Furthermore, additional operations may be added or removed depending on the particular applications. Further, the operations described in method 700 may be performed by different devices.

For example, the description is given from the perspective of a component of the video conference provider 402 but other configurations are possible. For instance, the elements of method 700 may be performed by a search agent application 430. One of ordinary skill in the art would recognize many variations, modifications, and alternatives.

The method 700 may include block 702. At block 702, the search agent application 430 receives, from a client device 410, a query. For example, a user of client device 410 may use query input 420, similar to the example shown in FIG. 6, to send a natural language query from the client device 410 to the search agent application 430. Because the search agent application 430 includes language models such as large language models (LLMs), the scope of the query is unbounded. However, the components of the search agent application 430, such as LLMs, can be configured with sufficient context to respond appropriately when the scope of the query exceeds what the components of the search agent application 430 may be capable of. For instance, if the query asks about the weather and none of the configured domain agents 440A . . . N or executors 450A . . . N include the capability to obtain such information, the search agent 435 can reply that the query is outside the scope of the multi-agent search client's capabilities based on a preconfigured query processing context.

At block 704, the search agent application 430 determines, using a search agent 435 and based on the query, one or more domain agents 440A . . . N to each execute at least a portion of the query. For example, the query may be divided into query portions by the search agent 435. A query such as "Please find me the first all-hands meeting last year" may be divided into query portions according to the available domain agents 440A . . . N and executors 450A . . . N. The search agent 435, which may be an LLM, may respond to prompts in the context of the configuration of the search agent application 430, including the types of domain agents 440A . . . N and executors 450A . . . N and their capabilities. This example query may be divided into query portions such as "find meetings last year," "find meetings from last year that were all-hands meetings," and "identify which, of the all-hands meetings from last year, was the first all-hands meeting." In this example, the LLM search agent 435 divided the query into 3 query portions, that paraphrased the original query into logical steps. The logical steps may correspond to the domains of the domain agents 440A . . . N.

At block 706, the search agent application 430 outputs, to a first domain agent, the at least a portion of the query. For example, the search agent 435 may determine a suitable domain or domains for each query portion and send the query portion to the corresponding domain agents 440A . . . N. Domains may include domain agent specializations such as video conferencing, chat, documents, meetings, humans, language, and so on. The domain agents 440A . . . N can be configured to map to any suitable domain. In some cases, domain agents 440A . . . N may be LLMs that are trained, fine-tuned, or otherwise specialized to particular domains. In other cases, the domain agents 440A . . . N are other hardware or software components that are specialized to particular domains. Domain agents 440A . . . N may include rule-based systems, expert systems, decision trees, neural networks, reinforcement learning agents, among many others. Each type of domain agent can be specialized to a particular domain in accordance with the operational constraints of the domain agent implementation.

At block 708, the search agent application 430 outputs, to a first executor, using the first domain agent, a first execution step based on the at least a portion of the query, wherein the first execution step is determined based on information about the first executor. For example, the first domain agent may be an LLM domain agent specialized for queries relating to video conferences or meetings. The first domain agent may thus receive query portions such as "find meetings last year" or "find meetings from last year that were all-hands meetings." The LLM first domain agent can determine execution steps for each query portion. The determined execution steps are based on the context of the available executors 450A . . . N and their capabilities. For instance, in this example, the available executors 450A . . . N may include a database client, an API client, a remote shell, scripting engine, message queue client, email client, cloud service interface, version control system client, and so on.

The first domain agent determines a first execution step based on the information about the executors 450A . . . N. For example, given the query portion "find meetings last year" the first domain agent may determine the execution step "perform a SQL query to determine all video meetings that took place during the year 2022 for the organization that the user belongs to." In this example, the execution step is a natural language execution step that may require further interpretation by an LLM associated with the first executor. For instance, the first executor may be an LLM with the ability to perform SQL queries. In another example, the first execution step is a valid SQL query. For example, the execution step may be a command to execute a SQL query using a remote shell such as "ssh user@remote_host 'psql-d example_db-c "SELECT meeting_id FROM meetings WHERE organization=123;"'."

Block 708 includes sub-block 709. At sub-block 709, the first executor generates one or more first instructions based on the first execution step, in which the first instructions are configured to generate a response to the first execution step. For example, an executor configured as a remote shell to execute the SQL query from the previous example may determine that the query needs to be executed in a suitable process. In another example, the executor is an LLM that determines the particular SQL query as well instructions to execute it such as commands for executing the database client.

Block 708 includes sub-block 711. At sub-block 711, the first executor outputs, for each of the first instructions, a command to execute the instruction. For example, given a first execution step containing the remote shell execution step, the first executor may output a command to execute the instruction in a shell process.

Block 708 includes sub-block 713. At sub-block 713, the first executor outputs, to the first domain agent, based on the outputs to the commands corresponding to the first instructions, the response to the first execution step. The outputs to the commands may be returned from the various executor functions in a variety of formats. For instance, SQL queries may be returned as tabular data, API requests may be returned in structured data formats such as JSON or XML. Some commands may return images, video, or audio. In some examples, the output is returned directly to the first domain agent. However, some executors, such as LLMs or LLMs used in association with other tools, may provide additional formatting functions to adapt the command returns to the execution steps. For example, an execution step to "perform a SQL query to determine all video meetings that took place during the year 2022 for the organization that the user belongs to" may result in tabular data. However, the executor may be configured to extract the data of interest, in this case a list of meeting IDs, and return it as a simple string of identifiers.

Note that in this example, the returned list of meeting IDs would then be used by the first executor to determine a second execution step relating to the next query portion to "find meetings from last year that were all-hands meetings." This may involve another SQL query, an API request, or other function. This example illustrates dependencies among query portions and the ordering of execution steps that may be performed by the domain agents 440A . . . N.

In some examples, the first domain agent may receive from the first executor, a request for additional information about the first execution step. Or, the first executor may receive, from the first domain agent, a request for additional information about its response to the first execution step. These are examples of inter-agent communications that are possible in a multi-agent system such as the one in certain embodiments of the present disclosure. In particular, when some of the domain agents 440A . . . N or executors 450A . . . N are LLMs, arbitrary natural language communication among the various components is possible. Such communication may be useful when, for instance, inadequate, invalid, or unclear instructions have been sent. In such cases, the agent in receipt of the request for additional information can response with suitable additional information to continue with the processing of the query.

At block 714, the search agent application 430 outputs, using the first domain agent, the response to the first execution step to the search agent 435. For example, in receipt of the execution step outputs as illustrated in block sub-block 713, the first domain agent can relay the response to the search agent 435. In some examples, an organizer 510 may be included to provide ordering and collation functions for query management. For instance, it may be desirable to provide a self-contained context to natural language instructions to the first domain agent or responses to the search agent 435. This may be desirable when the search agent application 430 is in use by multiple users and tracking the query context may be difficult without substantial appending of metadata or other means of tracking query context. The organizer 510 can provide these functions using asynchronous constructs such as futures to track queries, context, and expectations.

At block 716, the search agent application 430 outputs, using the search agent 435, to the client device 410, a response to the query based on the response to the first execution step. For example, if the search agent 435 is an LLM, it can receive responses from the various domain agents 440A . . . N provided with query portions and collate, combine, or otherwise organize the responses into a natural language response. For example, the query "Please find me the first all-hands meeting last year" may be answered with "The first all-hands meeting last year was on Jan. 15, 2022. Here is a link to more information about this meeting: http://example.com?meeting_id=123." This example illustrates that while the search agent 435 or domain agents 435A . . . N may receive responses in a variety of formats, the search agent 435 can reduce the results to a simple, human-readable response. Also illustrated in this result is the inclusion of information not specifically requested but that may be useful (e.g., the hyperlink for more information). Because the search agent 435 is an LLM, it can determine that such inclusions may be useful in some responses. In some examples, the search agent 435 can be trained or otherwise fine-tuned to include such configurations based on user or organization specifications or desires.

Figure 8:
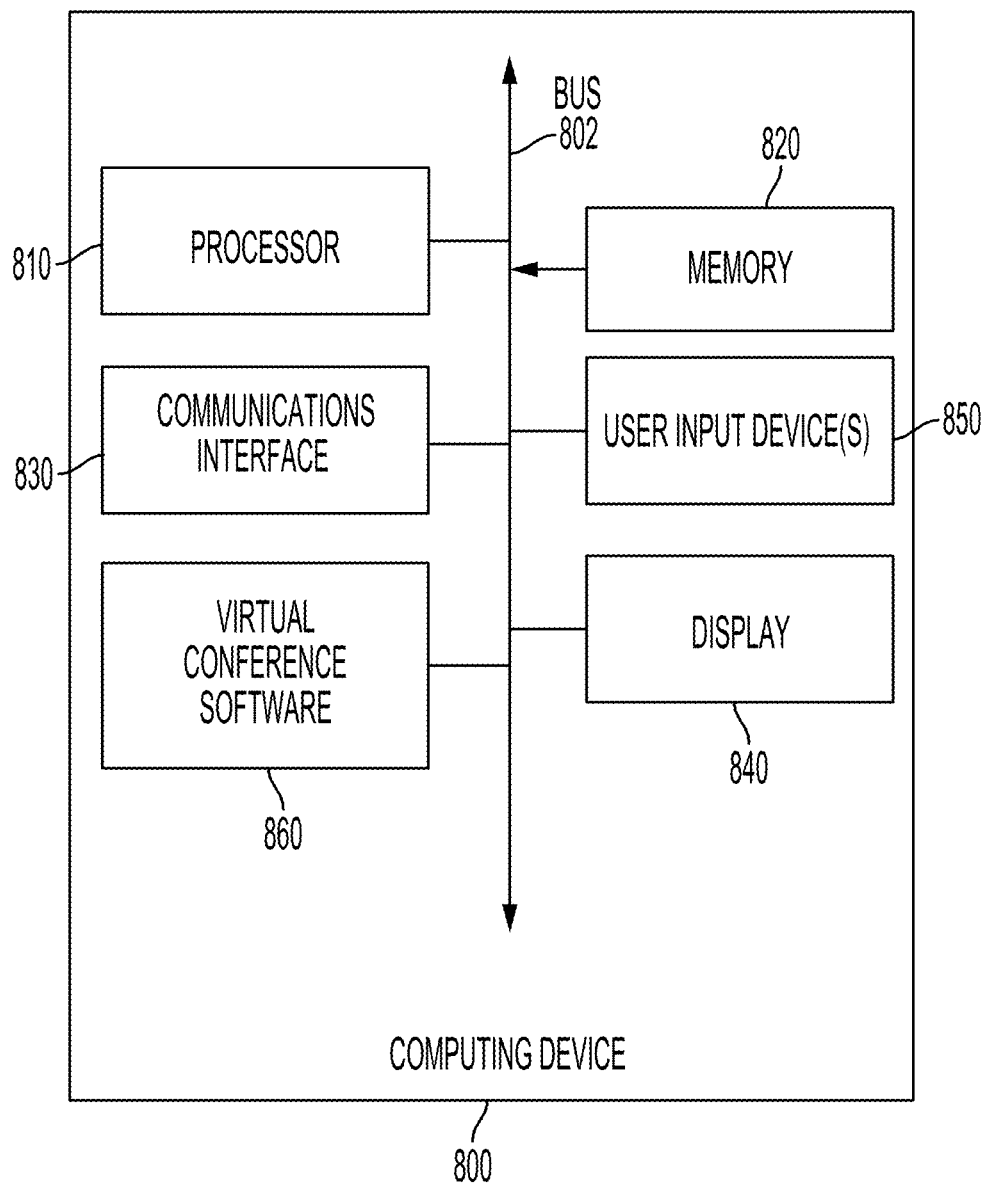
FIG. 8 shows an example computing device suitable for use in example systems or methods for providing a multi-agent search client, according to some aspects of the present disclosure.

Referring now to FIG. 8, FIG. 8 shows an example computing device 800 suitable for use in example systems or methods for providing a multi-agent search client according to this disclosure. The example computing device 800 includes a processor 810 which is in communication with the memory 820 and other components of the computing device 800 using one or more communications buses 802. The processor 810 is configured to execute processor-executable instructions stored in the memory 820 to perform one or more methods for multi-agent search clients according to different examples, such as part or all of the example method 700 described above with respect to FIGS. 7A and 7B. The computing device 800, in this example, also includes one or more user input devices 850, such as a keyboard, mouse, touchscreen, microphone, etc., to accept user input. The computing device 800 also includes a display 840 to provide visual output to a user.

In addition, the computing device 800 includes virtual conferencing software 860 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 800 also includes a communications interface 830. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a method, comprising: receiving, by a search agent application from a client device, a query; determining, by the search agent application using a search agent and based on the query, one or more domain agents to each execute at least a portion of the query; outputting, by the search agent application to a first domain agent, the at least the portion of the query; outputting, to a first executor, by the search agent application using the first domain agent, a first execution step based on the at least the portion of the query, wherein the first execution step is determined based on information about the first executor, wherein the first executor: generates one or more first instructions based on the first execution step, wherein the first instructions are configured to generate a response to the first execution step; outputs, for each of the first instructions, a command to execute the instruction; and outputs, to the first domain agent, based on the outputs to the commands corresponding to the first instructions, the response to the first execution step; outputting, by the search agent application using the first domain agent, the response to the first execution step to the search agent; and outputting, by the search agent application using the search agent, to the client device, a response to the query based on the response to the first execution step.

Example 2 is the method of example(s) 1, further comprising: outputting, to the first executor, by the search agent application using the first domain agent, a second execution step based on the at least the portion of the query and the response to the first execution step, wherein the second execution step is determined based on the information about the first executor, wherein the first executor: determines one or more second instructions based on the second execution step, wherein the second instructions are configured to generate a response to the second execution step; outputs, for each of the second instructions, a command to execute the instruction; and outputs, to the first domain agent, based on the outputs to the commands corresponding to the second instructions, the response to the second execution step; and outputting, by the search agent application using the first domain agent, the response to the second execution step to the search agent, wherein the response to the query is further based on the response to the second execution step.

Example 3 is the method of example(s) 1, further comprising: outputting, to the first executor, by the search agent application using a second domain agent, a second execution step based on the at least the portion of the query, wherein the second execution step is determined based on the information about the first executor, wherein the first executor: generates one or more second instructions based on the second execution step, wherein the second instructions are configured to generate a response to the second execution step; outputs, for each of the second instructions, a command to execute the instruction; and outputs, based on the outputs to the commands corresponding to the second instructions, the response to the second execution step; and outputting, by the search agent application using the first domain agent, the response to the second execution step to the search agent, wherein the response to the query is further based on the response to the second execution step.

Example 4 is the method of example(s) 3, further comprising: outputting, by the search agent application using the search agent, to the client device, the response to the query based on the response to the first execution step and the response to the second execution step comprises: outputting, by the search agent application using the first domain agent, to an organizer component, the response to the first execution step and the response to the second execution step; and generating, by the search agent application using the organizer component and based on the response to the first execution step and the response to the second execution step, information for generating the response to the query, wherein the response to the query is further based on the information for generating the response to the query.

Example 5 is the method of example(s) 1, further comprising: outputting, to a second executor, by the search agent application using the first domain agent, a second execution step based on the at least the portion of the query, wherein the second execution step is determined based on information about the second executor, wherein the second executor: generates one or more second instructions based on the second execution step, wherein the second instructions are configured to generate a response to the second execution step; outputs, for each of the second instructions, a command to execute the instruction; and outputs, to the first domain agent, based on the outputs to the commands corresponding to the second instructions, the response to the second execution step; and outputting, by the search agent application using the first domain agent, the response to the second execution step to the search agent, wherein the response to the query is further based on the response to the second execution step.

Example 6 is the method of example(s) 1, wherein the search agent is a first large language model (LLM) and the first domain agent is a second LLM.

Example 7 is the method of example(s) 6, wherein the first executor is a third LLM.

Example 8 is the method of example(s) 6, wherein the information about the first executor includes one or more operations available for performance by the first executor.

Example 9 is the method of example(s) 8, wherein the one or more operations available for performance by the first executor comprise application programming interface (API) requests.

Example 10 is the method of example(s) 1, wherein: the one or more domain agents are each mapped to a domain; and determining, by the search agent application using a search agent and based on the query, the one or more domain agents to each execute the at least the portion of the query comprises determining a domain of the at least the portion of the query, the domain of the at least the portion of the query corresponding to a domain mapped to a domain agent of the one or more domain agents.

Example 11 is the method of example(s) 10, wherein the domains mapped to the one or more domain agents comprise video, chat, documents, meetings, or language.

Example 12 is the method of example(s) 1, wherein the query comprises human-readable text and a plurality of portions, each portion of the plurality of portions corresponding to one or more domains from among a plurality of domains.

Example 13 is the method of example(s) 1, further comprising: receiving, by the search agent application using the first domain agent, from the first executor, a request for additional information about the first execution step based on the at least the portion of the query; and receiving, by the search agent application using the first executor, from the first domain agent, the additional information about the first execution step based on the at least the portion of the query.

Example 14 is the method of example(s) 1, further comprising: receiving, by the search agent application using the first executor, from the first domain agent, a request for additional information about the response to the first execution step; and receiving, by the search agent application using the first domain agent, from the first executor, the additional information about the first execution step based on the response to the first execution step.

Example 15 is a non-transitory computer-readable medium storing instructions that, when executed by one or more processors, cause the one or more processors to perform operations including: receiving, by a search agent application from a client device, a query; determining, by the search agent application using a search agent and based on the query, one or more domain agents to each execute at least a portion of the query; outputting, by the search agent application to a first domain agent, the at least the portion of the query; outputting, to a first executor, by the search agent application using the first domain agent, a first execution step based on the at least the portion of the query, wherein the first execution step is determined based on information about the first executor, wherein the first executor: generates one or more first instructions based on the first execution step, wherein the first instructions are configured to generate a response to the first execution step; outputs, for each of the first instructions, a command to execute the instruction; and outputs, to the first domain agent, based on the outputs to the commands corresponding to the first instructions, the response to the first execution step; outputting, by the search agent application using the first domain agent, the response to the first execution step to the search agent; and outputting, by the search agent application using the search agent, to the client device, a response to the query based on the response to the first execution step.

Example 16 is the non-transitory computer-readable medium of example(s) 15, wherein the search agent is a first large language model (LLM), the first domain agent is a second LLM, and the first executor is a third LLM.

Example 17 is the non-transitory computer-readable medium of example(s) 15, further comprising: outputting, to the first executor, by the search agent application using a second domain agent, a second execution step based on the at least the portion of the query, wherein the second execution step is determined based on the information about the first executor, wherein the first executor: generates one or more second instructions based on the second execution step, wherein the second instructions are configured to generate a response to the second execution step; outputs, for each of the second instructions, a command to execute the instruction; and outputs, based on the outputs to the commands corresponding to the second instructions, the response to the second execution step; outputting, by the search agent application using the first domain agent, the response to the second execution step to the search agent, wherein the response to the query is further based on the response to the second execution step; receiving, by the search agent application using the first domain agent, from the second domain agent, a request for additional information about a particular portion of the query; and receiving, by the search agent application using the second domain agent, from the first domain agent, the additional information about the particular portion of the query.

Example 18 is the non-transitory computer-readable medium of example(s) 15, wherein the first executor comprises an API client.

Example 19 is a system comprising: one or more processors; and one or more computer-readable storage media storing instructions which, when executed by the one or more processors, cause the one or more processors to perform operations including: receiving, by a search agent application from a client device, a query; determining, by the search agent application using a search agent and based on the query, one or more domain agents to each execute at least a portion of the query; outputting, by the search agent application to a first domain agent, the at least the portion of the query; outputting, to a first executor, by the search agent application using the first domain agent, a first execution step based on the at least the portion of the query, wherein the first execution step is determined based on information about the first executor, wherein the first executor: generates one or more first instructions based on the first execution step, wherein the first instructions are configured to generate a response to the first execution step; outputs, for each of the first instructions, a command to execute the instruction; and outputs, to the first domain agent, based on the outputs to the commands corresponding to the first instructions, the response to the first execution step; outputting, by the search agent application using the first domain agent, the response to the first execution step to the search agent; and outputting, by the search agent application using the search agent, to the client device, a response to the query based on the response to the first execution step.

Example 20 is the system of example(s) 19, wherein the search agent is a first large language model (LLM), the first domain agent is a second LLM, wherein the first LLM and the second LLM are the same LLM.

What is claimed is:

1. A method, comprising:
receiving, by a search agent application from a client device, a query;
determining, by the search agent application using a search agent and based on the query, one or more domain agents to each execute at least a portion of the query;
outputting, by the search agent application to a first domain agent, the at least the portion of the query;
outputting, to a first executor, by the search agent application using the first domain agent, a first execution step based on the at least the portion of the query, wherein the first execution step is determined based on information about the first executor, wherein the first executor:
  generates one or more first instructions based on the first execution step, wherein the first instructions are configured to generate a response to the first execution step;
  outputs, for each of the first instructions, a command to execute the first instruction; and
  outputs, to the first domain agent, based on the outputs to the commands corresponding to the first instructions, the response to the first execution step;
outputting, by the search agent application using the first domain agent, the response to the first execution step to the search agent; and
outputting, by the search agent application using the search agent, to the client device, a response to the query based on the response to the first execution step.

2. The method of claim 1, further comprising:
outputting, to the first executor, by the search agent application using the first domain agent, a second execution step based on the at least the portion of the query and the response to the first execution step, wherein the second execution step is determined based on the information about the first executor, wherein the first executor:
  determines one or more second instructions based on the second execution step, wherein the second instructions are configured to generate a response to the second execution step;
  outputs, for each of the second instructions, a command to execute the second instruction; and
  outputs, to the first domain agent, based on the outputs to the commands corresponding to the second instructions, the response to the second execution step; and
outputting, by the search agent application using the first domain agent, the response to the second execution step to the search agent, wherein the response to the query is further based on the response to the second execution step.

3. The method of claim 1, further comprising:
outputting, to the first executor, by the search agent application using a second domain agent, a second execution step based on the at least the portion of the query, wherein the second execution step is determined based on the information about the first executor, wherein the first executor:
  generates one or more second instructions based on the second execution step, wherein the second instructions are configured to generate a response to the second execution step;
  outputs, for each of the second instructions, a command to execute the second instruction; and outputs, based on the outputs to the commands corresponding to the second instructions, the response to the second execution step; and outputting, by the search agent application using the first domain agent, the response to the second execution step to the search agent, wherein the response to the query is further based on the response to the second execution step.

4. The method of claim 3, further comprising:
outputting, by the search agent application using the search agent, to the client device, the response to the query based on the response to the first execution step and the response to the second execution step comprises:
outputting, by the search agent application using the first domain agent, to an organizer component, the response to the first execution step and the response to the second execution step; and
generating, by the search agent application using the organizer component and based on the response to the first execution step and the response to the second execution step, information for generating the response to the query, wherein the response to the query is further based on the information for generating the response to the query.

5. The method of claim 1, further comprising:
outputting, to a second executor, by the search agent application using the first domain agent, a second execution step based on the at least the portion of the query, wherein the second execution step is determined based on information about the second executor, wherein the second executor:
generates one or more second instructions based on the second execution step, wherein the second instructions are configured to generate a response to the second execution step;
outputs, for each of the second instructions, a command to execute the second instruction; and
outputs, to the first domain agent, based on the outputs to the commands corresponding to the second instructions, the response to the second execution step; and
outputting, by the search agent application using the first domain agent, the response to the second execution step to the search agent, wherein the response to the query is further based on the response to the second execution step.

6. The method of claim 1, wherein the search agent is a first large language model (LLM) and the first domain agent is a second LLM.

7. The method of claim 6, wherein the first executor is a third LLM.

8. The method of claim 6, wherein the information about the first executor includes one or more operations available for performance by the first executor.

9. The method of claim 8, wherein the one or more operations available for performance by the first executor comprise application programming interface (API) requests.

10. The method of claim 1, wherein:
the one or more domain agents are each mapped to a domain; and
determining, by the search agent application using a search agent and based on the query, the one or more domain agents to each execute the at least the portion of the query comprises determining a domain of the at least the portion of the query, the domain of the at least the portion of the query corresponding to a domain mapped to a domain agent of the one or more domain agents.

11. The method of claim 10, wherein the domains mapped to the one or more domain agents comprise video, chat, documents, meetings, or language.

12. The method of claim 1, wherein the query comprises human-readable text and a plurality of portions, each portion of the plurality of portions corresponding to one or more domains from among a plurality of domains.

13. The method of claim 1, further comprising:
receiving, by the search agent application using the first domain agent, from the first executor, a request for additional information about the first execution step based on the at least the portion of the query; and
receiving, by the search agent application using the first executor, from the first domain agent, the additional information about the first execution step based on the at least the portion of the query.

14. The method of claim 1, further comprising:
receiving, by the search agent application using the first executor, from the first domain agent, a request for additional information about the response to the first execution step; and
receiving, by the search agent application using the first domain agent, from the first executor, the additional information about the first execution step based on the response to the first execution step.

15. A non-transitory computer-readable storage medium storing instructions that, when executed by one or more processors, cause the one or more processors to perform operations including:
receiving, by a search agent application from a client device, a query;
determining, by the search agent application using a search agent and based on the query, one or more domain agents to each execute at least a portion of the query;
outputting, by the search agent application to a first domain agent, the at least the portion of the query;
outputting, to a first executor, by the search agent application using the first domain agent, a first execution step based on the at least the portion of the query, wherein the first execution step is determined based on information about the first executor, wherein the first executor:
generates one or more first instructions based on the first execution step, wherein the first instructions are configured to generate a response to the first execution step;
outputs, for each of the first instructions, a command to execute the first instruction; and
outputs, to the first domain agent, based on the outputs to the commands corresponding to the first instructions, the response to the first execution step;
outputting, by the search agent application using the first domain agent, the response to the first execution step to the search agent; and
outputting, by the search agent application using the search agent, to the client device, a response to the query based on the response to the first execution step.

16. The non-transitory computer-readable storage medium of claim 15, wherein the search agent is a first large language model (LLM), the first domain agent is a second LLM, and the first executor is a third LLM.

17. The non-transitory computer-readable storage medium of claim 15, further comprising:

outputting, to the first executor, by the search agent application using a second domain agent, a second execution step based on the at least the portion of the query, wherein the second execution step is determined based on the information about the first executor, wherein the first executor:
  generates one or more second instructions based on the second execution step, wherein the second instructions are configured to generate a response to the second execution step;
  outputs, for each of the second instructions, a command to execute the second instruction; and
  outputs, based on the outputs to the commands corresponding to the second instructions, the response to the second execution step;
outputting, by the search agent application using the first domain agent, the response to the second execution step to the search agent, wherein the response to the query is further based on the response to the second execution step;
  receiving, by the search agent application using the first domain agent, from the second domain agent, a request for additional information about a particular portion of the query; and
  receiving, by the search agent application using the second domain agent, from the first domain agent, the additional information about the particular portion of the query.

18. The non-transitory computer-readable storage medium of claim 15, wherein the first executor comprises an API client.

19. A system comprising:
  one or more processors; and
  one or more computer-readable storage media storing instructions which, when executed by the one or more processors, cause the one or more processors to perform operations including:
    receiving, by a search agent application from a client device, a query;
      determining, by the search agent application using a search agent and based on the query, one or more domain agents to each execute at least a portion of the query;
      outputting, by the search agent application to a first domain agent, the at least the portion of the query;
      outputting, to a first executor, by the search agent application using the first domain agent, a first execution step based on the at least the portion of the query, wherein the first execution step is determined based on information about the first executor, wherein the first executor:
        generates one or more first instructions based on the first execution step, wherein the first instructions are configured to generate a response to the first execution step;
        outputs, for each of the first instructions, a command to execute the first instruction; and
        outputs, to the first domain agent, based on the outputs to the commands corresponding to the first instructions, the response to the first execution step;
      outputting, by the search agent application using the first domain agent, the response to the first execution step to the search agent; and
      outputting, by the search agent application using the search agent, to the client device, a response to the query based on the response to the first execution step.

20. The system of claim 19, wherein the search agent is a first large language model (LLM), the first domain agent is a second LLM, wherein the first LLM and the second LLM are the same LLM.

* * * * *